(12) United States Patent
Ramesh et al.

(10) Patent No.: US 11,137,982 B2
(45) Date of Patent: Oct. 5, 2021

(54) ACCELERATION CIRCUITRY

(71) Applicant: Micron Technology, Inc., Boise, ID (US)

(72) Inventors: Vijay S. Ramesh, Boise, ID (US); Richard C. Murphy, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 245 days.

(21) Appl. No.: 16/286,992

(22) Filed: Feb. 27, 2019

(65) Prior Publication Data
US 2020/0272416 A1    Aug. 27, 2020

(51) Int. Cl.
*G06F 7/485*     (2006.01)
*G06F 5/01*      (2006.01)
*G06F 7/499*     (2006.01)

(52) U.S. Cl.
CPC .............. *G06F 7/485* (2013.01); *G06F 5/012* (2013.01); *G06F 7/49915* (2013.01); *G06F 2207/3832* (2013.01)

(58) Field of Classification Search
CPC ....... G06F 7/485; G06F 7/49915; G06F 5/012
USPC ................................. 708/204, 505
See application file for complete search history.

(56) References Cited

U.S. PATENT DOCUMENTS

| 4,758,972 | A | 7/1988 | Frazier |
| 7,865,541 | B1 | 1/2011 | Langhammer |
| 8,214,417 | B2 | 7/2012 | Ahmed |
| 9,405,505 | B2 * | 8/2016 | Nagashima ............ G05B 15/02 |
| 10,778,245 | B1 * | 9/2020 | Ramesh .................. H03M 7/28 |
| 10,833,700 | B2 * | 11/2020 | Ramesh .................. H03M 7/14 |
| 2014/0188962 | A1 * | 7/2014 | Hack .................... G06F 9/30094 708/204 |
| 2015/0254065 | A1 * | 9/2015 | Brooks .................. G06F 7/483 708/204 |
| 2016/0092165 | A1 * | 3/2016 | Bradbury ................. G06F 5/00 708/201 |

OTHER PUBLICATIONS

Gustafson, et al. "Beating Floating Point at its Own Game: Posit Arithmetic", Jan. 2017, (16 pgs). retrieved from <http://www.johngustafson.net/pdfs/BeatingFloatingPoint.pdf>.

* cited by examiner

*Primary Examiner* — Tan V Mai
(74) *Attorney, Agent, or Firm* — Brooks, Cameron & Huebsch, PLLC

(57) ABSTRACT

Systems, apparatuses, and methods related to acceleration circuitry are described. The acceleration circuitry may be deployed in a memory device and can include a memory resource and/or logic circuitry. The acceleration circuitry can perform operations on data to convert the data between one or more numeric formats, such as floating-point and/or universal number (e.g., posit) formats. The acceleration circuitry can perform arithmetic and/or logical operations on the data after the data has been converted to a particular format. For instance, the memory resource can receive data comprising a bit string having a first format that provides a first level of precision. The logic circuitry can receive the data from the memory resource and convert the bit string to a second format that provides a second level of precision that is different from the first level of precision.

21 Claims, 4 Drawing Sheets

ACCELERATION CIRCUITRY

TECHNICAL FIELD

The present disclosure relates generally to semiconductor memory and methods, and more particularly, to apparatuses, systems, and methods for acceleration circuitry.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
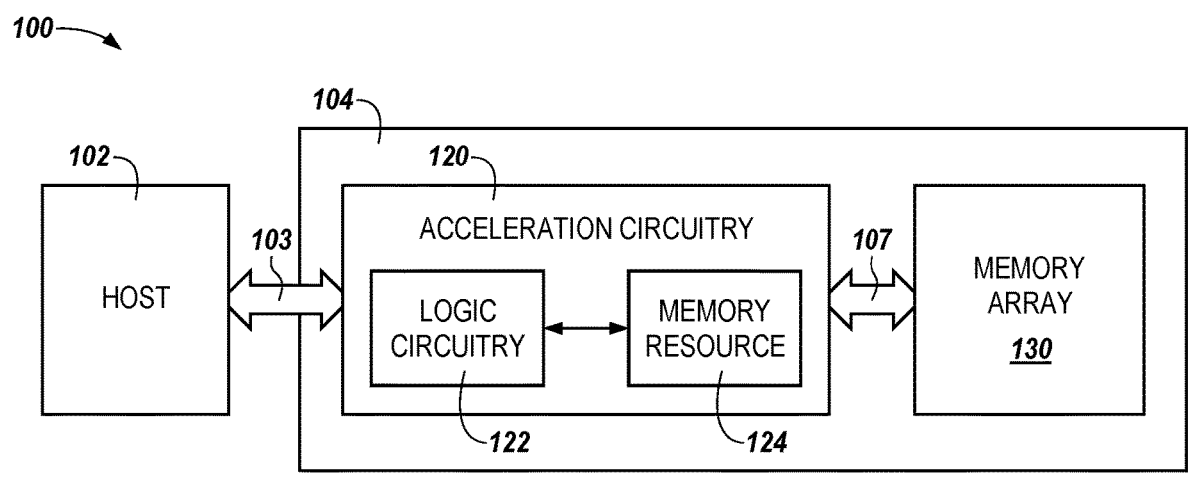
FIG. 1 is a functional block diagram in the form of a computing system including an apparatus including a host and a memory device in accordance with a number of embodiments of the present disclosure.

Systems, apparatuses, and methods related to acceleration circuitry are described. The acceleration circuitry may be deployed in a memory device and can include a memory resource and/or logic circuitry. The acceleration circuitry can perform operations on data to convert the data between one or more numeric formats, such as floating-point and/or universal number (e.g., posit) formats. The acceleration circuitry can perform arithmetic and/or logical operations on the data after the data has been converted to a particular format. For instance, the memory resource can receive data comprising a bit string having a first format that provides a first level of precision. The logic circuitry can receive data from the memory resource and convert the bit string to a second format that provides a second level of precision that is different from the first level of precision.

Computing systems may perform a wide range of operations that can include various calculations, which can require differing degrees of accuracy. However, computing systems have a finite amount of memory in which to store operands on which calculations are to be performed. In order to facilitate performance of operation on operands stored by a computing system within the constraints imposed by finite memory resources, in some approaches operands are stored in particular formats. One such format is referred to as the "floating-point" format, or "float," for simplicity (e.g., the IEEE 754 floating-point format).

Under the floating-point standard, bit strings (e.g., strings of bits that can represent a number), such as binary number strings, are represented in terms of three sets of integers or sets of bits—a set of bits referred to as a "base," a set of bits referred to as an "exponent," and a set of bits referred to as a "mantissa" (or significand). The sets of integers or bits that define the format in which a binary number string is stored may be referred to herein as an "numeric format," or "format," for simplicity. For example, the three sets of integers of bits described above (e.g., the base, exponent, and mantissa) that define a floating-point bit string may be referred to as a format (e.g., a first format). As described in more detail below, a posit bit string may include four sets of integers or sets of bits (e.g., a sign, a regime, an exponent, and a mantissa), which may also be referred to as a "numeric format," or "format," (e.g., a second format). In addition, under the floating-point standard, two infinities (e.g., +∞ and −∞) and/or two kinds of "NaN" (not-a-number): a quiet NaN and a signaling NaN, may be included in a bit string.

The floating-point standard has been used in computing systems for a number of years and defines arithmetic formats, interchange formats, rounding rules, operations, and exception handling for computation carried out by many computing systems. Arithmetic formats can include binary and/or decimal floating-point data, which can include finite numbers, infinities, and/or special NaN values. Interchange formats can include encodings (e.g., bit strings) that may be used to exchange floating-point data. Rounding rules can include a set of properties that may be satisfied when rounding numbers during arithmetic operations and/or conversion operations. Floating-point operations can include arithmetic operations and/or other computational operations such as trigonometric functions. Exception handling can include indications of exceptional conditions, such as division by zero, overflows, etc.

An alternative format to floating-point is referred to as a "universal number" (unum) format. There are several forms of unum formats—Type I unums, Type II unums, and Type III unums, which can be referred to as "posits" and/or "valids." Type I unums are a superset of the IEEE 754 standard floating-point format that use a "ubit" at the end of the fraction to indicate whether a real number is an exact float, or if it lies in the interval between adjacent floats. The sign, exponent, and fraction bits in a Type I unum take their definition from the IEEE 754 floating-point format, however, the length of the exponent and fraction fields of Type I unums can vary dramatically, from a single bit to a maximum user-definable length. By taking the sign, exponent, and fraction bits from the IEEE 754 standard floating-point format, Type I unums can behave similar to floating-point numbers, however, the variable bit length exhibited in the exponent and fraction bits of the Type I unum can require additional management in comparison to floats.

Type II unums are generally incompatible with floats, which permits a clean, mathematical design based on projected real numbers. A Type II unum can include n bits and can be described in terms of a "u-lattice" in which quadrants of a circular projection are populated with an ordered set of $2^{n-3}-1$ real numbers. The values of the Type II unum can be reflected about an axis bisecting the circular projection such that positive values lie in an upper right quadrant of the circular projection, while their negative counterparts lie in an upper left quadrant of the circular projection. The lower half of the circular projection representing a Type II unum can include reciprocals of the values that lie in the upper half of the circular projection. Type II unums generally rely on a look-up table for most operations. For example, the size of the look-up table can limit the efficacy of Type II unums in some circumstances. However, Type II unums can provide improved computational functionality in comparison with floats under some conditions.

The Type III unum format is referred to herein as a "posit format" or, for simplicity, a "posit." In contrast to floating-point bit strings, posits can, under certain conditions, allow for a broader dynamic range and a higher accuracy (e.g., precision) than floating-point numbers with the same bit width. This can allow for operations performed by a computing system to be performed at a higher rate (e.g., faster) when using posits than with floating-point numbers, which, in turn, can improve the performance of the computing system by, for example, reducing a number of clock cycles used in performing operations thereby reducing processing time and/or power consumed in performing such operations. In addition, the use of posits in computing systems can allow for higher accuracy and/or precision than floating-point numbers, which can further improve the functioning of a computing system in comparison to some approaches (e.g., approaches which rely upon floating-point format bit strings).

Embodiments herein are directed to hardware circuitry (e.g., logic circuitry) configured to perform various operations on bit strings to improve the overall functioning of a computing device. For example, embodiments herein are directed to hardware circuitry that is configured to perform conversion operations to convert a format of a bit string from a first format (e.g., a floating-point format) to a second format (e.g., a universal number format, a posit format, etc.). Once the bit string(s) have been converted to the second format, the circuitry can be operated to perform operations (e.g., arithmetic operations, logical operations, bitwise operations, vector operations, etc.) on the converted bit strings.

In some embodiments, the circuitry can be further operated to convert the results of the operations back to the first format (e.g., to a floating-point format), which can, in turn, be transferred to different circuitry (e.g., a host, another component in a memory device, etc.) of the computing system. By performing the operations in such a manner, the logic circuitry can facilitate improved performance of the computing system by allowing for improved accuracy in the performed operations, improved speed in performing the operations, and/or a reduced required storage space for bit strings during performance of arithmetic and/or logical operations.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "X," "Y," "N," "M," "A," "B," "C," "D," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "bit strings," "data," and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 120 may reference element "20" in FIG. 1, and a similar element may be referenced as 220 in FIG. 2. A group or plurality of similar elements or components may generally be referred to herein with a single element number. For example, a plurality of reference elements 433-1, 433-2, . . . 433-N may be referred to generally as 433. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a host 102 and a memory device 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory device 104 can include a one or more memory modules (e.g., single in-line memory modules, dual in-line memory modules, etc.). The memory device 104 can include volatile memory and/or non-volatile memory. In a number of embodiments, memory device 104 can include a multi-chip device. A multi-chip device can include a number of different memory types and/or memory modules. For example, a memory system can include non-volatile or volatile memory on any type of a module. In addition, each of the components (e.g., the host 102, the acceleration circuitry 120, the logic circuitry 122, the memory resource 124, and/or the memory array 130) can be separately referred to herein as an "apparatus."

The memory device 104 can provide main memory for the computing system 100 or could be used as additional memory or storage throughout the computing system 100. The memory device 104 can include one or more memory arrays 130 (e.g., arrays of memory cells), which can include volatile and/or non-volatile memory cells. The memory array 130 can be a flash array with a NAND architecture, for example. Embodiments are not limited to a particular type of memory device. For instance, the memory device 104 can include RAM, ROM, DRAM, SDRAM, PCRAM, RRAM, and flash memory, among others.

In embodiments in which the memory device 104 includes non-volatile memory, the memory device 104 can include flash memory devices such as NAND or NOR flash memory devices. Embodiments are not so limited, however, and the memory device 104 can include other non-volatile memory devices such as non-volatile random-access memory devices (e.g., NVRAM, ReRAM, FeRAM, MRAM, PCM), "emerging" memory devices such as 3-D Crosspoint (3D XP) memory devices, etc., or combinations thereof.

As illustrated in FIG. 1, a host 102 can be coupled to the memory device 104. In a number of embodiments, the memory device 104 can be coupled to the host 102 via one or more channels (e.g., channel 103). In FIG. 1, the memory device 104 is coupled to the host 102 via channel 103 and acceleration circuitry 120 of the memory device 104 is coupled to the memory array 130 via a channel 107. The host 102 can be a host system such as a personal laptop computer, a desktop computer, a digital camera, a smart phone, a memory card reader, and/or internet-of-thing enabled device, among various other types of hosts, and can include a memory access device, e.g., a processor (or processing device). One of ordinary skill in the art will appreciate that "a processor" can intend one or more processors, such as a parallel processing system, a number of coprocessors, etc.

The host 102 can include a system motherboard and/or backplane and can include a number of processing resources (e.g., one or more processors, microprocessors, or some other type of controlling circuitry). The system 100 can include separate integrated circuits or both the host 102, the memory device 104, and the memory array 130 can be on the same integrated circuit. The system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

Figure 2:
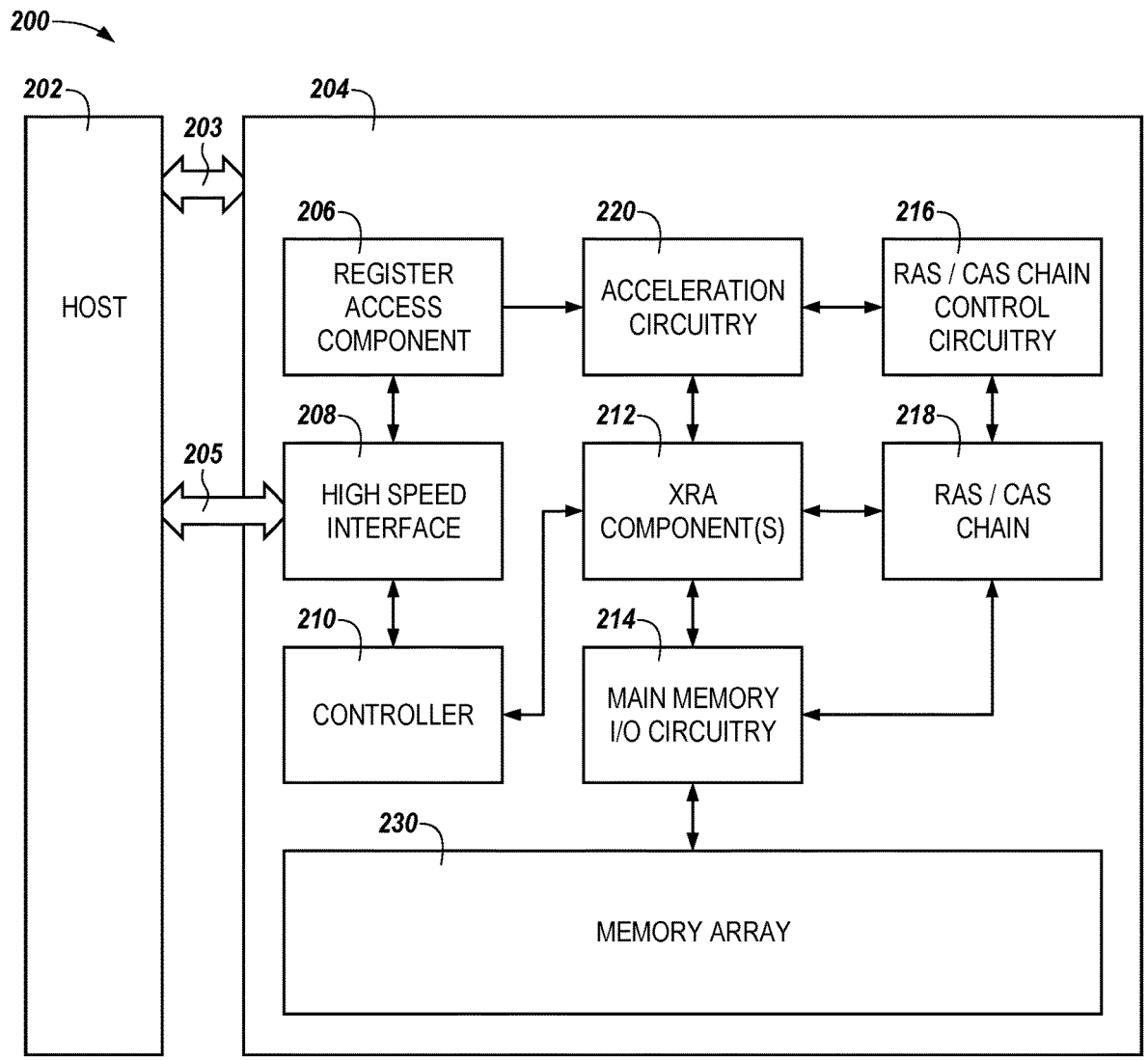
FIG. 2 is another functional block diagram in the form of a computing system including an apparatus including a host and a memory device in accordance with a number of embodiments of the present disclosure.

The memory device 104, which is shown in more detail in FIG. 2, herein, can include acceleration circuitry 120, which can include logic circuitry 122 and a memory resource 124. The logic circuitry 122 can be provided in the form of an integrated circuit, such as an application-specific integrated circuit (ASIC), field programmable gate array (FPGA), system-on-a-chip, or other combination of hardware and/or circuitry that is configured to perform operations described in more detail, herein. For example, the logic circuitry 122 can be configured to receive one or more bit strings (e.g., a plurality of bits) in a first format (e.g., a plurality of bits in a floating-point format), convert the bit string(s) to a second format (e.g., convert the bit string(s) to a posit format), and/or cause performance of operations such as arithmetic and/or logical operations using the bit string(s) having the second format. As used herein, the bit string(s) in the second format (e.g., bit string(s) in the posit format) include at least one bit referred to as a "sign," a set of bits referred to as a "regime," a set of bits referred to as an "exponent," and a set of bits referred to as a "mantissa" (or significand). As used herein, a set of bits is intended to refer to a subset of bits included in a bit string. Examples of the sign, regime, exponent, and mantissa sets of bits are described in more detail in connection with FIGS. 3 and 4A-4B, herein.

The operations can include conversion operations to convert floating-point bit strings (e.g., floating-point numbers) to bit strings in a posit format, and vice versa. Once the floating-point bit strings are converted to bit strings in the posit format, the logic circuitry 122 can be configured to perform (or cause performance of) arithmetic operations such as addition, subtraction, multiplication, division, fused multiply addition, multiply-accumulate, dot product units, greater than or less than, absolute value (e.g., FABS( )), fast Fourier transforms, inverse fast Fourier transforms, sigmoid function, convolution, square root, exponent, and/or logarithm operations, and/or logical operations such as AND, OR, XOR, NOT, etc., as well as trigonometric operations such as sine, cosine, tangent, etc. using the posit bit strings. As will be appreciated, the foregoing list of operations is not intended to be exhaustive, nor is the foregoing list of operations intended to be limiting, and the logic circuitry 122 may be configured to perform (or cause performance of) other arithmetic and/or logical operations.

The logic circuitry 122 can include an arithmetic logic unit (ALU). The ALU can include circuitry (e.g., hardware, logic, one or more processing devices, etc.) to perform operations (e.g., arithmetic operations, logical operations, bitwise operations, etc.) such as the operations described above, on integer binary bit strings, such as bit strings in the posit format. Embodiments are not limited to an ALU, however, and in some embodiments, the logic circuitry 122 can include a state machine and/or an instruction set architecture (or combinations thereof) in addition to, or in lieu of the ALU, as described in more detail in connection with FIG. 5, herein.

The acceleration circuitry 120 can further include a memory resource 124, which can be communicatively coupled to the logic circuitry 122. The memory resource 124 can include volatile memory resource, non-volatile memory resources, or a combination of volatile and non-volatile memory resources. In some embodiments, the memory resource can be a random-access memory (RAM) such as static random-access memory (SRAM). Embodiments are not so limited, however, and the memory resource can be a cache, one or more registers, NVRAM, ReRAM, FeRAM, MRAM, PCM), "emerging" memory devices such as 3-D Crosspoint (3D XP) memory devices, etc., or combinations thereof.

In some embodiments, the memory resource 124 can receive data comprising a bit string having a first format that provides a first level of precision. The logic circuitry 122 can receive the data from the memory resource and convert the bit string to a second format that provides a second level of precision that is different from the first level of precision. The first level of precision can, in some embodiments, be lower than the second level of precision. For example, if the first format is a floating-point format and the second format is a universal number or posit format, the floating-point bit string may provide a lower level of precision under certain conditions than the universal number or posit bit string, as described in more detail in connection with FIGS. 3 and 4A-4B, herein.

The first format can be a floating-point format (e.g., an IEEE 754 format) and the second format can be a universal number format (e.g., a Type I unum format, a Type II unum format, a Type III unum format, a posit format, a valid format, etc.). As a result, the first format can include a mantissa, a base, and an exponent portion, and the second format can include a mantissa, a sign, a regime, and an exponent portion.

The logic circuitry 122 can be configured to cause performance of an arithmetic operation or a logical operation, or both, using the bit string having the second format. For example, the logic circuitry 122 can perform one or more operations on the bit string in the second format to produce a result of an arithmetic operation and/or a logical operation using the bit string in the second format as an operand for the arithmetic and/or logical operation.

In some embodiments, the logic circuitry 122 can be configured to convert the bit string to the first format in response to a determination that the operation using the bit string is completed. For example, once the operation (e.g., the arithmetic operations and/or logical operation) is completed, the resultant bit string may be provided in the second format. In order to transfer the resultant bit string to the host 102, for example, the logic circuitry 122 may convert the resultant bit string back to the first format so that the host 102 can process the resultant bit string.

In a non-limiting example, the logic circuitry 122 and the memory resource 124 are included in a memory device 104. The memory device 104 is coupled to the host 102. The memory device 104 can receive the data in the first format from the host and/or convert the data to the second format. Subsequent to conversion of the data form the first format to the second format, an operation using the bit string having the second format can be performed. As described above, the operation can be an arithmetic operation, a logical operation, a bitwise operation, a vector operation, or other operation. The memory device 104 (e.g., the acceleration circuitry 120) can convert a resultant bit string that represents performance of the operation to the first format in response to a determination that the operation using the bit string having the second format is completed and transfer the resultant bit string having the first format to the host 102. In some embodiments, the memory device 104 can perform the operation, convert the resultant bit string, and transfer the converted resultant bit string without receipt of an intervening command from the host 102. That is, in some embodiments, the acceleration circuitry 120 can perform the operation, convert the resultant bit string, and transfer the converted resultant bit string in response to receipt of the bit string in the first format without additional input from (e.g., without encumbering) the host 102.

The acceleration circuitry 120 can be communicatively coupled to the memory array 130 via one or more channels 107. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines, which may be referred to herein as word lines or select lines, and columns coupled by sense lines, which may be referred to herein as data lines or digit lines. Although a single array 130 is shown in FIG. 1, embodiments are not so limited. For instance, memory device 104 a number of memory arrays 130 (e.g., a number of banks of DRAM cells, NAND flash cells, etc.).

The embodiment of FIG. 1 can include additional circuitry that is not illustrated so as not to obscure embodiments of the present disclosure. For example, the memory device 104 can include address circuitry to latch address signals provided over I/O connections through I/O circuitry. Address signals can be received and decoded by a row decoder and a column decoder to access the memory device 104 and/or the memory array 130. It will be appreciated by those skilled in the art that the number of address input connections can depend on the density and architecture of the memory device 104 and/or the memory array 130.

FIG. 2 is another functional block diagram in the form of a computing system including an apparatus 200 including a host 202 and a memory device 204 in accordance with a number of embodiments of the present disclosure. The memory device 204 can include acceleration circuitry 220, which can be analogous to the acceleration circuitry 120 illustrated in FIG. 1. Similarly, the host 202 can be analogous to the host 102 illustrated in FIG. 1, the memory device 204 can be analogous to the memory device 104 illustrated in FIG. 1, and the memory array 230 can be analogous to the memory array 130 illustrated in FIG. 1. Each of the components (e.g., the host 202, the acceleration circuitry 220, the logic circuitry 222, the memory resource 224, and/or the memory array 230, etc.) can be separately referred to herein as an "apparatus."

The host 202 can be communicatively coupled to the memory device 204 via one or more channels 203, 205. The channels 203, 205 can be interfaces or other physical connections that allow for data and/or commands to be transferred between the host 202 and the memory device 205. For example, commands to cause initiation of an operation (e.g., an operation to convert bit string(s) in a floating-point format to bit string(s) in a posit format, as well as subsequent arithmetic and/or logical operations on the bit string(s) in the posit format) to be performed by the acceleration circuitry 220 can be transferred from the host via the channels 203, 205. It is noted that, in some examples, the acceleration circuitry 220 can perform the operations in response to an initiation command transferred from the host 202 via one or more of the channels 203, 205 in the absence of an intervening command from the host 202. That is, once the acceleration circuitry 220 has received the command to initiate performance of an operation from the host 202, the operations can be performed by the acceleration circuitry 220 in the absence of additional commands from the host 202.

As shown in FIG. 2, the memory device 204 can include a register access component 206, a high speed interface (HSI) 208, a controller 210, one or more extended row address (XRA) component(s) 212, main memory input/output (I/O) circuitry 214, row address strobe (RAS)/column address strobe (CAS) chain control circuitry 216, a RAS/CAS chain component 218, acceleration circuitry 220, and a memory array 230. The acceleration circuitry 220 is, as shown in FIG. 2, located in an area of the memory device 204 that is physically distinct from the memory array 230. That is, in some embodiments, the acceleration circuitry 220 is located in a periphery location of the memory array 230.

The register access component 206 can facilitate transferring and fetching of data from the host 202 to the memory device 204 and from the memory device 204 to the host 202. For example, the register access component 206 can store addresses (or facilitate lookup of addresses), such as memory addresses, that correspond to data that is to be transferred to the host 202 form the memory device 204 or transferred from the host 202 to the memory device 204. In some embodiments, the register access component 206 can facilitate transferring and fetching data that is to be operated upon by the acceleration circuitry 220 and/or the register access component 206 can facilitate transferring and fetching data that is has been operated upon by the acceleration circuitry 220 for transfer to the host 202.

The HSI 208 can provide an interface between the host 202 and the memory device 204 for commands and/or data traversing the channel 205. The HSI 208 can be a double data rate (DDR) interface such as a DDR3, DDR4, DDR5, etc. interface. Embodiments are not limited to a DDR interface, however, and the HSI 208 can be a quad data rate (QDR) interface, peripheral component interconnect (PCI) interface (e.g., a peripheral component interconnect express (PCIe)) interface, or other suitable interface for transferring commands and/or data between the host 202 and the memory device 204.

The controller 210 can be responsible for executing instructions from the host 202 and accessing the acceleration circuitry 220 and/or the memory array 230. The controller 210 can be a state machine, a sequencer, or some other type of controller. The controller 210 can receive commands from the host 202 (via the HSI 208, for example) and, based on the received commands, control operation of the acceleration circuitry 220 and/or the memory array 230. In some embodiments, the controller 210 can receive a command from the host 202 to cause performance of an operation using the acceleration circuitry 220. Responsive to receipt of such a command, the controller 210 can instruct the acceleration circuitry 220 to begin performance of the operation(s).

In some embodiments, the controller 210 can be a global processing controller and may provide power management functions to the memory device 204. Power management functions can include control over power consumed by the memory device 204 and/or the memory array 230. For example, the controller 210 can control power provided to various banks of the memory array 230 to control which banks of the memory array 230 are operational at different times during operation of the memory device 204. This can include shutting certain banks of the memory array 230 down while providing power to other banks of the memory array 230 to optimize power consumption of the memory device 230. In some embodiments, the controller 210 controlling power consumption of the memory device 204 can include controlling power to various cores of the memory device 204 and/or to the acceleration circuitry 220, the memory array 230, etc.

The XRA component(s) 212 are intended to provide additional functionalities (e.g., peripheral amplifiers) that sense (e.g., read, store, cache) data values of memory cells in the memory array 230 and that are distinct from the memory array 230. The XRA components 212 can include latches and/or registers. For example, additional latches can be included in the XRA component 212. The latches of the XRA component 212 can be located on a periphery of the memory array 230 (e.g., on a periphery of one or more banks of memory cells) of the memory device 204.

The main memory input/output (I/O) circuitry 214 can facilitate transfer of data and/or commands to and from the memory array 230. For example, the main memory I/O circuitry 214 can facilitate transfer of bit strings, data, and/or commands from the host 202 and/or the acceleration circuitry 220 to and from the memory array 230. In some embodiments, the main memory I/O circuitry 214 can include one or more direct memory access (DMA) components that can transfer the bit strings (e.g., posit bit strings stored as blocks of data) from the acceleration circuitry 220 to the memory array 230, and vice versa.

In some embodiments, the main memory I/O circuitry 214 can facilitate transfer of bit strings, data, and/or commands from the memory array 230 to the acceleration circuitry 220 so that the acceleration circuitry 220 can perform operations on the bit strings. Similarly, the main memory I/O circuitry 214 can facilitate transfer of bit strings that have had one or more operations performed on them by the acceleration circuitry 220 to the memory array 230. As described in more detail herein, the operations can include operations to convert bit strings formatted according to the floating-point standard to bit strings formatted as a posit (and vice versa), arithmetic operations performed on the data formatted as a posit, logical operations performed on the bit strings formatted as a posit, etc.

The row address strobe (RAS)/column address strobe (CAS) chain control circuitry 216 and the RAS/CAS chain component 218 can be used in conjunction with the memory array 230 to latch a row address and/or a column address to initiate a memory cycle. In some embodiments, the RAS/CAS chain control circuitry 216 and/or the RAS/CAS chain component 218 can resolve row and/or column addresses of the memory array 230 at which read and write operations associated with the memory array 230 are to be initiated or terminated. For example, upon completion of an operation using the acceleration circuitry 220, the RAS/CAS chain control circuitry 216 and/or the RAS/CAS chain component 218 can latch and/or resolve a specific location in the memory array 230 to which the bit strings that have been operated upon by the acceleration circuitry 220 are to be stored. Similarly, the RAS/CAS chain control circuitry 216 and/or the RAS/CAS chain component 218 can latch and/or resolve a specific location in the memory array 230 from which bit strings are to be transferred to the acceleration circuitry 220 prior to the acceleration circuitry 220 performing an operation on the bit string(s).

As described above in connection with FIG. 1 and in more detail below in connection with FIG. 5, the acceleration circuitry 220 can be configured to receive one or more bit strings in a first format (e.g., a plurality of bits in a floating-point format), convert the one or more bit strings to a second format (e.g., convert the plurality of bits to a posit format), and/or cause performance of operations such as arithmetic and/or logical operations using the one or more bit strings having the second format.

The acceleration circuitry 220 can include logic circuitry (e.g., the logic circuitry 122 illustrated in FIG. 1) and/or memory resource(s) (e.g., the memory resource 124 illustrated in FIG. 1). Bit strings (e.g., data, a plurality of bits, etc.) can be received by the acceleration circuitry 220 from, for example, the host 202 and/or the memory array 230, and stored by the acceleration circuitry 220, for example in the memory resource of the acceleration circuitry 220. The acceleration circuitry (e.g., the logic circuitry of the acceleration circuitry 220) can perform operations (or cause operations to be performed on) the bit string(s) to convert the bit string(s) from a floating-point format to a posit format, as described in more detail in connection with FIG. 5, herein.

As described in more detail in connection with FIGS. 3 and 4A-4B, posits can provide improved accuracy and may require less storage space (e.g., may contain a smaller number of bits) than corresponding bit strings represented in the floating-point format. Accordingly, by converting the floating-point bit strings to posit bit strings using the acceleration circuitry 220, performance of the memory device 202 may be improved in comparison to approaches that utilize only floating-point bit strings because operations may be performed more quickly on the posit bit strings (e.g., because the data in the posit format is smaller and therefore requires less time to perform operations on) and because less memory space is required in the memory device 202 to store the bit strings in the posit format, which can free up additional space in the memory device 202 for other bit strings, data, and/or other operations to be performed.

Once the acceleration circuitry 220 has performed the operation(s) to convert the data from the floating-point format to the posit format, the acceleration circuitry can perform (or cause performance of) arithmetic and/or logical operations on the resultant posit data. For example, as discussed above, the acceleration circuitry 220 can be configured to perform (or cause performance of) arithmetic operations such as addition, subtraction, multiplication, division, fused multiply addition, multiply-accumulate, dot product units, greater than or less than, absolute value (e.g., FAB S( )), fast Fourier transforms, inverse fast Fourier transforms, sigmoid function, convolution, square root, exponent, and/or logarithm operations, and/or logical operations such as AND, OR, XOR, NOT, etc., as well as trigonometric operations such as sine, cosine, tangent, etc. As will be appreciated, the foregoing list of operations is not intended to be exhaustive, nor is the foregoing list of operations intended to be limiting, and the acceleration circuitry 220 may be configured to perform (or cause performance of) other arithmetic and/or logical operations on posit bit strings.

In some embodiments, the acceleration circuitry 220 may perform the above-listed operations in conjunction with execution of one or more machine learning algorithms. For example, the acceleration circuitry 220 may perform operations related to one or more neural networks. Neural networks may allow for an algorithm to be trained over time to determine an output response based on input signals. For example, over time, a neural network may essentially learn to better maximize the chance of completing a particular goal. This may be advantageous in machine learning applications because the neural network may be trained over time with new data to achieve better maximization of the chance of completing the particular goal. A neural network may be trained over time to improve operation of particular tasks and/or particular goals. However, in some approaches, machine learning (e.g., neural network training) may be processing intensive (e.g., may consume large amounts of computer processing resources) and/or may be time intensive (e.g., may require lengthy calculations that consume multiple cycles to be performed). In contrast, by performing such operations using the acceleration circuitry 220, for example, by performing such operations on bit strings that have been converted by the acceleration circuitry 220 into a posit format, the amount of processing resources and/or the amount of time consumed in performing the operations may be reduced in comparison to approaches in which such operations are performed using bit strings in a floating-point format.

In a non-limiting example, the memory device 204 can receive data comprising a bit string having a first format that supports arithmetic operations to a first level of precision from the host 102. That is, the acceleration circuitry 120, which can include logic circuitry (e.g., the logic circuitry 122 illustrated in FIG. 1) and a memory resource (e.g., the memory resource 124 illustrated in FIG. 1) can receive data comprising a bit string having a first format that supports arithmetic operations to a first level of precision from the host 102. In some embodiments, the controller 210 can cause the logic circuitry to perform a conversion operation to convert the bit string to a second format.

The first format can be an IEEE 754 format and the second format comprises a Type III Unum format or a posit format, or vice versa. For example, the first format can include three sets of bits, and the second format can include four sets of bits, or vice versa.

In some embodiments, the controller 210 can be configured to cause the logic circuitry to perform the conversion operation without encumbering the host 202 (e.g., without receiving an intervening command or a command separate from a command to initiate performance of the conversion operation from the host 202). Embodiments are not so limited, however, and in some embodiments, the controller 210 can be configured to cause the acceleration circuitry 220 (e.g., the logic circuitry) to perform an arithmetic operation or a logical operation, or both, on the bit string having the second format.

As described above in connection with FIG. 1, the memory array 230 can be a DRAM array, SRAM array, STT RAM array, PCRAM array, TRAM array, RRAM array, NAND flash array, and/or NOR flash array, for instance, although embodiments are not limited to these particular examples. The memory array 230 can function as main memory for the computing system 200 shown in FIG. 2. In some embodiments, the memory array 230 can be configured to store bit strings operated on by the acceleration circuitry 220 and/or store bit strings to be transferred to the acceleration circuitry 220.

Figure 3:
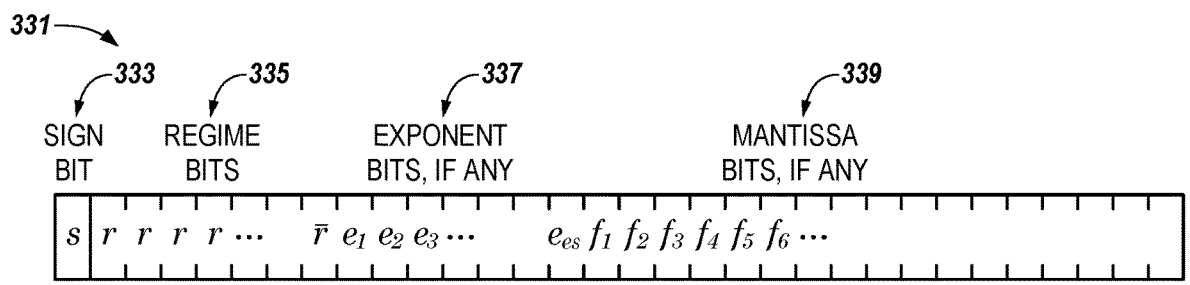
FIG. 3 is an example of an n-bit post with es exponent bits.

FIG. 3 is an example of an n-bit universal number, or "unum" with es exponent bits. In the example of FIG. 3, the n-bit unum is a posit bit string 331. As shown in FIG. 3, the n-bit posit 331 can include a set of sign bit(s) (e.g., a sign bit 333), a set of regime bits (e.g., the regime bits 335), a set of exponent bits (e.g., the exponent bits 337), and a set of mantissa bits (e.g., the mantissa bits 339). The mantissa bits 339 can be referred to in the alternative as a "fraction portion" or as "fraction bits," and can represent a portion of a bit string (e.g., a number) that follows a decimal point.

The sign bit 333 can be zero (0) for positive numbers and one (1) for negative numbers. The regime bits 335 are described in connection with Table 1, below, which shows (binary) bit strings and their related numerical meaning, k. In Table 1, the numerical meaning, k, is determined by the run length of the bit string. The letter x in the binary portion of Table 1 indicates that the bit value is irrelevant for determination of the regime, because the (binary) bit string is terminated in response to successive bit flips or when the end of the bit string is reached. For example, in the (binary) bit string 0010, the bit string terminates in response to a zero flipping to a one and then back to a zero. Accordingly, the last zero is irrelevant with respect to the regime and all that is considered for the regime are the leading identical bits and the first opposite bit that terminates the bit string (if the bit string includes such bits).

TABLE 1

| Binary | 0000 | 0001 | 001X | 01XX | 10XX | 110X | 1110 | 1111 |
|---|---|---|---|---|---|---|---|---|
| Numerical (k) | −4 | −3 | −2 | −1 | 0 | 1 | 2 | 3 |

In FIG. 3, the regime bits 335 r correspond to identical bits in the bit string, while the regime bits 335 r̄ correspond to an opposite bit that terminates the bit string. For example, for the numerical k value −2 shown in Table 1, the regime bits r correspond to the first two leading zeros, while the regime bit(s) $\bar{r}$ correspond to the one. As noted above, the final bit corresponding to the numerical k, which is represented by the X in Table 1 is irrelevant to the regime.

If m corresponds to the number of identical bits in the bit string, if the bits are zero, k=−m. If the bits are one, then k=m−1. This is illustrated in Table 1 where, for example, the (binary) bit string 10XX has a single one and k=m−1=1−1=0. Similarly, the (binary) bit string 0001 includes three zeros so k=−m=−3. The regime can indicate a scale factor of useed*, where useed=$2^{2^{es}}$. Several example values for used are shown below in Table 2.

TABLE 2

| es   | 0 | 1       | 2        | 3           | 4                |
|------|---|---------|----------|-------------|------------------|
| used | 2 | $2^2=4$ | $4^2=16$ | $16^2=256$  | $256^2=65536$    |

The exponent bits 337 correspond to an exponent e, as an unsigned number. In contrast to floating-point numbers, the exponent bits 337 described herein may not have a bias associated therewith. As a result, the exponent bits 337 described herein may represent a scaling by a factor of $2^e$. As shown in FIG. 3, there can be up to es exponent bits ($e_1$, $e_2$, $e_3$, ... $e_{es}$), depending on how many bits remain to right of the regime bits 335 of the n-bit posit 331. In some embodiments, this can allow for tapered accuracy of the n-bit posit 331 in which numbers which are nearer in magnitude to one have a higher accuracy than numbers which are very large or very small. However, as very large or very small numbers may be utilized less frequent in certain kinds of operations, the tapered accuracy behavior of the n-bit posit 331 shown in FIG. 3 may be desirable in a wide range of situations.

The mantissa bits 339 (or fraction bits) represent any additional bits that may be part of the n-bit posit 331 that lie to the right of the exponent bits 337. Similar to floating-point bit strings, the mantissa bits 339 represent a fraction $f$, which can be analogous to the fraction 1.$f$, where $f$ includes one or more bits to the right of the decimal point following the one. In contrast to floating-point bit strings, however, in the n-bit posit 331 shown in FIG. 3, the "hidden bit" (e.g., the one) may always be one (e.g., unity), whereas floating-point bit strings may include a subnormal number with a "hidden bit" of zero (e.g., 0.$f$).

Figure 4A:
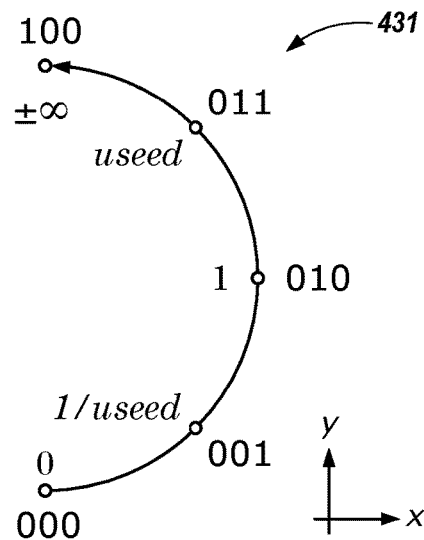
FIG. 4A is an example of positive values for a 3-bit posit.

FIG. 4A is an example of positive values for a 3-bit posit. In FIG. 4A, only the right half of projective real numbers, however, it will be appreciated that negative projective real numbers that correspond to their positive counterparts shown in FIG. 4A can exist on a curve representing a transformation about the y-axis of the curves shown in FIG. 4A.

In the example of FIG. 4A, es=2, so useed=$2^{2^{es}}$=16. The precision of a posit 431-1 can be increased by appending bits the bit string, as shown in FIG. 4B. For example, appending a bit with a value of one (1) to bit strings of the posit 431-1 increases the accuracy of the posit 431-1 as shown by the posit 431-2 in FIG. 4B. Similarly, appending a bit with a value of one to bit strings of the posit 431-2 in FIG. 4B increases the accuracy of the posit 431-2 as shown by the posit 431-3 shown in FIG. 4B. An example of interpolation rules that may be used to append bits to the bits strings of the posits 431-1 shown in FIG. 4A to obtain the posits 431-2, 431-3 illustrated in FIG. 4B follow.

If maxpos is the largest positive value of a bit string of the posits 431-1, 431-2, 431-3 and minpos is the smallest value of a bit string of the posits 431-1, 431-2, 431-3, maxpos may be equivalent to useed and minpos may be equivalent to $$\frac{1}{useed}.$$

Between maxpos and ±∞, a new bit value may be maxpos*useed, and between zero and minpos, a new bit value may be $$\frac{minpos}{useed}.$$

These new bit values can correspond to a new regime bit 335. Between existing values x=$2^m$ and y=$2^n$, where m and n differ by more than one, the new bit value may be given by the geometric mean:

$$\sqrt{x \times y} = 2^{\frac{(m+n)}{2}},$$

which corresponds to a new exponent bit 337. If the new bit value is midway between the existing x and y values next to it, the new bit value can represent the arithmetic mean $$\frac{x+y}{2},$$

which corresponds to a new mantissa bit 339.

Figure 4B:
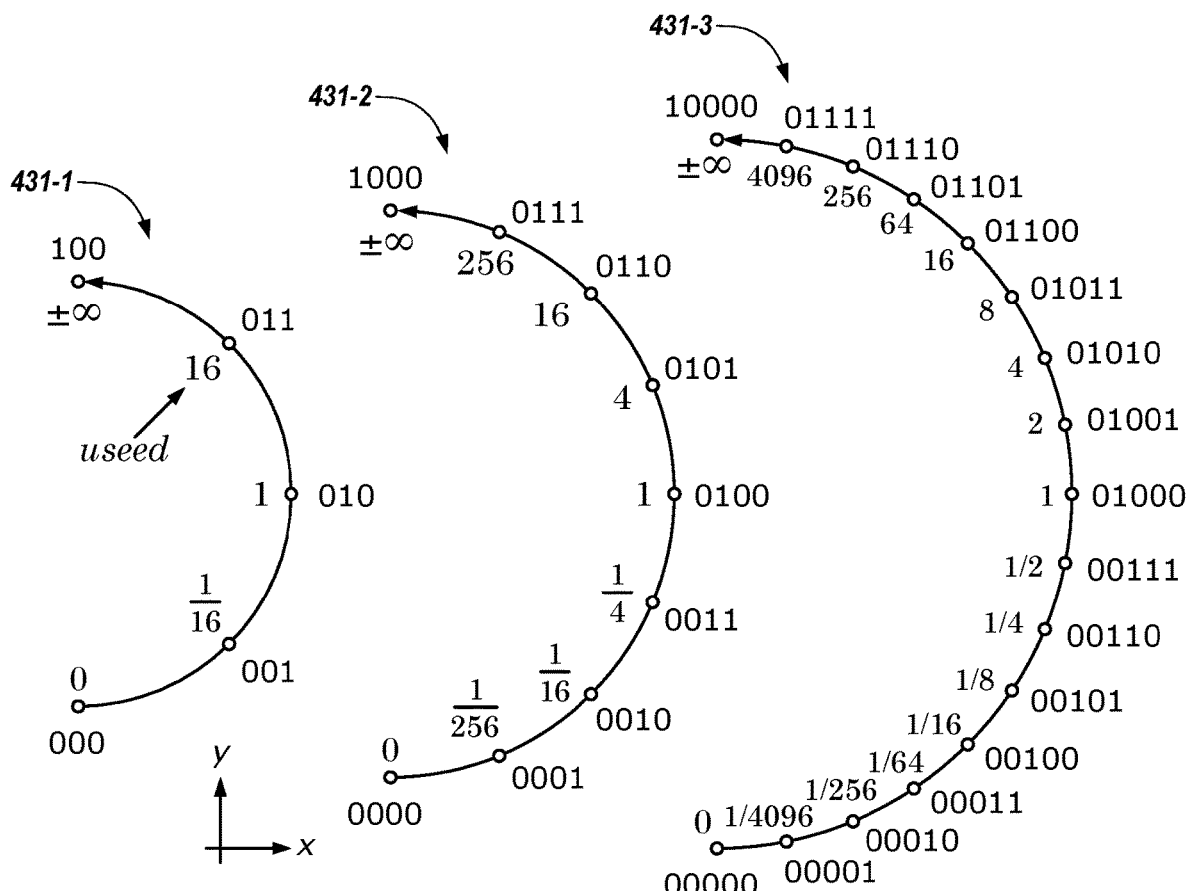
FIG. 4B is an example of posit construction using two exponent bits.

FIG. 4B is an example of posit construction using two exponent bits. In FIG. 4B, only the right half of projective real numbers, however, it will be appreciated that negative projective real numbers that correspond to their positive counterparts shown in FIG. 4B can exist on a curve representing a transformation about the y-axis of the curves shown in FIG. 4B. The posits 431-1, 431-2, 431-3 shown in FIG. 4B each include only two exception values: Zero (0) when all the bits of the bit string are zero and ±∞ when the bit string is a one (1) followed by all zeros. It is noted that the numerical values of the posits 431-1, 431-2, 431-3 shown in FIG. 4 are exactly useed*. That is, the numerical values of the posits 431-1, 431-2, 431-3 shown in FIG. 4 are exactly useed to the power of the k value represented by the regime (e.g., the regime bits 335 described above in connection with FIG. 3). In FIG. 4B, the posit 431-1 has es=2, so useed=$2^{2^{es}}$=16, the posit 431-2 has es=3, so useed=$2^{2^{es}}$=256, and the posit 431-3 has es=4, so useed=$2^{2^{es}}$=4096.

As an illustrative example of adding bits to the 3-bit posit 431-1 to create the 4-bit posit 431-2 of FIG. 4B, the useed=256, so the bit string corresponding to the useed of 256 has an additional regime bit appended thereto and the former useed, 16, has a terminating regime bit ($\bar{r}$) appended thereto. As described above, between existing values, the corresponding bit strings have an additional exponent bit appended thereto. For example, the numerical values ¹⁄₁₆, ¼, 1, and 4 will have an exponent bit appended thereto. That is, the final one corresponding to the numerical value 4 is an exponent bit, the final zero corresponding to the numerical value 1 is an exponent bit, etc. This pattern can be further seen in the posit 431-3, which is a 5-bit posit generated according to the rules above from the 4-bit posit 431-2. If another bit was added to the posit 431-3 in FIG. 4B to generate a 6-bit posit, mantissa bits 339 would be appended to the numerical values between ¹⁄₁₆ and 16.

A non-limiting example of decoding a posit (e.g., a posit 431) to obtain its numerical equivalent follows. In some embodiments, the bit string corresponding to a posit p is an unsigned integer ranging from $-2^{n-1}$ to $2^{n-1}$, k is an integer corresponding to the regime bits 335 and e is an unsigned integer corresponding to the exponent bits 337. If the set of mantissa bits 339 is represented as $\{f_1 f_2 \ldots f_{fs}\}$ and $f$ is a value represented by $1.f_1 f_2 \ldots f_{fs}$ (e.g., by a one followed by a decimal point followed by the mantissa bits 339), the p can be given by Equation 1, below.

$$x = \begin{cases} 0, & p = 0 \\ \pm\infty, & p = -2^{n-1} \\ \text{sign}(p) \times useed^k \times 2^e \times f, & \text{all other } p \end{cases} \quad \text{Equation 1}$$

A further illustrative example of decoding a posit bit string is provided below in connection with the posit bit string 0000110111011101 shown in Table 3, below follows.

TABLE 3

| SIGN | REGIME | EXPONENT | MANTISSA |
|---|---|---|---|
| 0 | 0001 | 101 | 11011101 |

In Table 3, the posit bit string 0000110111011101 is broken up into its constituent sets of bits (e.g., the sign bit 333, the regime bits 335, the exponent bits 337, and the mantissa bits 339). Since es=3 in the posit bit string shown in Table 3 (e.g., because there are three exponent bits), useed=256. Because the sign bit 333 is zero, the value of the numerical expression corresponding to the posit bit string shown in Table 3 is positive. The regime bits 335 have a run of three consecutive zeros corresponding to a value of −3 (as described above in connection with Table 1). As a result, the scale factor contributed by the regime bits 335 is $256^{-3}$ (e.g., $useed^k$). The exponent bits 337 represent five (5) as an unsigned integer and therefore contribute an additional scale factor of $2^e = 2^5 = 32$. Lastly, the mantissa bits 339, which are given in Table 3 as 11011101, represent two-hundred and twenty-one (221) as an unsigned integer, so the mantissa bits 339, given above as $f$ are $$f + \frac{221}{256}.$$

Using these values and Equation 1, the numerical value corresponding to the posit bit string given in Table 3 is $$+256^{-3} \times 2^5 \times \left(1 + \frac{221}{256}\right) = \frac{437}{134217728} \approx 3.55393 \times 10^{-6}.$$

Figure 5:
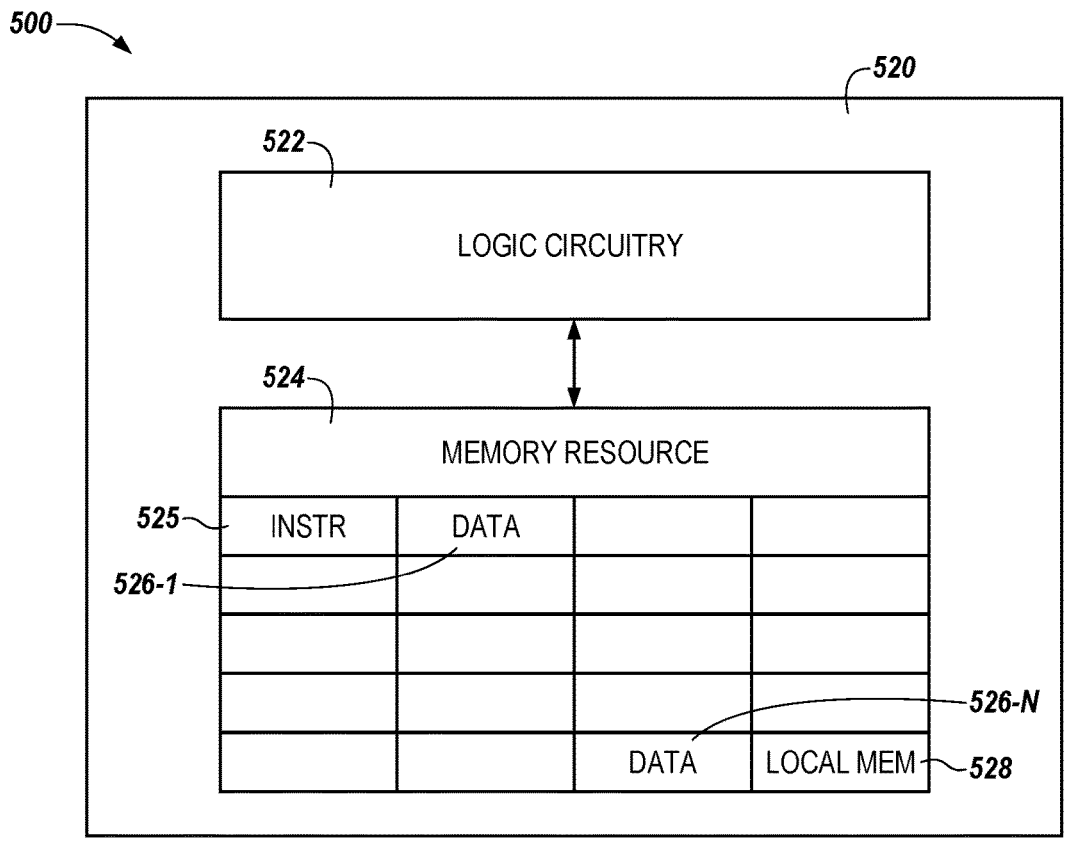
FIG. 5 is a functional block diagram in the form of acceleration circuitry in accordance with a number of embodiments of the present disclosure.

FIG. 5 is a functional block diagram in the form of an apparatus 500 including acceleration circuitry 520 in accordance with a number of embodiments of the present disclosure. The acceleration circuitry 520 can include logic circuitry 522 and a memory resource 524, which can be analogous to the logic circuitry 122/222 and the memory resource 124/224 illustrated in FIGS. 1 and 2, herein. The logic circuitry 522 and/or the memory resource 524 can separately be considered an "apparatus."

The acceleration circuitry 520 can be configured to receive a command (e.g., an initiation command) from a host (e.g., the host 102/202 illustrated in FIGS. 1 and 2, herein) and/or a controller (e.g., the controller 210 illustrated in FIG. 2, herein) to initiate performance of one or more operations (e.g., operations to convert bit strings between various formats, arithmetic operations, logical operations, bitwise operations, vector operations, etc.) on data stored in the memory resource 524. Once the initiation command has been received by the acceleration circuitry 520, the acceleration circuitry can perform the operations described above in the absence of intervening commands from the host and/or the controller. For example, the acceleration circuitry 520 can include sufficient processing resources and/or instructions to perform operations on the bit strings stored in the memory resource 524 without receiving additional commands from circuitry external to the acceleration circuitry 520.

The logic circuitry 522 can be an arithmetic logic unit (ALU), a state machine, sequencer, controller, an instruction set architecture, or other type of control circuitry. As described above, an ALU can include circuitry to perform operations (e.g., operations to convert a bit string from a first format, such as a floating-point format, to a second format such as universal number format or a posit format, and/or arithmetic operations, logical operations, bitwise operations, etc.) such as the operations described above, on integer binary numbers, such as bit strings in the posit format. An instruction set architecture (ISA) can include a reduced instruction set computing (RISC) device. In embodiments in which the logic circuitry 522 includes a RISC device, the RISC device can include a processing resource that can employ an instruction set architecture (ISA) such as a RISC-V ISA, however, embodiments are not limited to RISC-V ISAs and other processing devices and/or ISAs can be used.

In some embodiments, the logic circuitry 522 can be configured to execute instructions (e.g., instructions stored in the INSTR 525 portion of the memory resource 524) to perform the operations above. For example, the logic circuitry 524 is provisioned with sufficient processing resources to cause performance of such operations on the data (e.g., on bit strings) received by the acceleration circuitry 520.

Once the operation(s) are performed by the logic circuitry 522, the resultant bit strings can be stored in the memory resource 524 and/or a memory array (e.g., the memory array 230 illustrated in FIG. 2, herein). The stored resultant bit strings can be addressed such that it is accessible for performance of the operations. For example, the bit strings can be stored in the memory resource 524 and/or the memory array at particular physical addresses (which may have corresponding logical addresses corresponding thereto) such that the bit strings can be accessed in performing the operations.

The memory resource 524 can, in some embodiments, be a memory resource such as random-access memory (e.g., RAM, SRAM, etc.). Embodiments are not so limited, however, and the memory resource 524 can include various registers, caches, buffers, and/or memory arrays (e.g., 1T1C, 2T2C, 3T, etc. DRAM arrays). The memory resource 524 can be configured to receive a bit string(s) from, for example, a host such as the host 102/202 illustrated in FIGS. 1 and 2 and/or a memory array such as the memory array 130/230 illustrated in FIGS. 1 and 2, herein. In some embodiments, the memory resource 538 can have a size of approximately 256 kilobytes (KB), however, embodiments are not limited to this particular size, and the memory resource 524 can have a size greater than, or less than, 256 KB.

The memory resource 524 can be partitioned into one or more addressable memory regions. As shown in FIG. 5, the memory resource 524 can be partitioned into addressable memory regions so that various types of data can be stored therein. For example, one or more memory regions can store instructions ("INSTR") 525 used by the memory resource 524, one or more memory regions can store data 526-1, . . . 526-N (e.g., data such as a bit string retrieved from the host and/or the memory array), and/or one or more memory regions can serve as a local memory ("LOCAL MEM.") 528 portion of the memory resource 538. Although 20 distinct memory regions are shown in FIG. 5, it will be appreciated that the memory resource 524 can be partitioned into any number of distinct memory regions.

As discussed above, the bit string(s) can be retrieved from the host and/or memory array in response to messages and/or commands generated by the host, a controller (e.g., the controller 210 illustrated in FIG. 2, herein), or the logic circuitry 522. In some embodiments, the commands and/or messages can be processed by the logic circuitry 522. Once the bit string(s) are received by the acceleration circuitry 520 and stored in the memory resource 524, they can be processed by the logic circuitry 522. Processing the bit string(s) by the logic circuitry 522 can include converting the bit string(s) from a first format to a second format, performing arithmetic operations and/or logical operations on the converted bit string(s), and/or converting the bit string(s) that have been operated upon from the second format to the first format.

In a non-limiting neural network training application, the acceleration circuitry 520 can convert a floating-point bit string into an 8-bit posit with es=0. In contrast to some approaches that utilize a half-precision 16-bit floating-point bit string for neural network training, an 8-bit posit bit string with es=0 can provide comparable neural network training results two to four times faster than the half-precision 16-bit floating-point bit string.

A common function used in training neural networks is a sigmoid function $f(x)$ (e.g., a function that asymptotically approaches zero as $x \to -\infty$ and asymptotically approaches 1 as $x \to \infty$). An example of a sigmoid function that may be used in neural network training applications is $$\frac{1}{1+e^{-x}},$$

which can require upwards of one-hundred clock cycles to compute using half-precision 16-bit floating-point bit strings. However, using an 8-bit posit with es=0, the same function can be evaluated by the acceleration circuitry 520 by flipping the first bit of the posit representing x and shifting two bits to the right—operations that may take at least an order of magnitude fewer clock signals in comparison to evaluation of the same function using a half-precision 16-bit floating-point bit string.

In this example, by operating the acceleration circuitry 520 to convert a floating-point bit string into an 8-bit posit bit string with es=0 and then subsequently operating the acceleration circuitry 520 to perform the operation to evaluate the example sigmoid function on the 8-bit posit bit string, processing time, resource consumption, and/or storage space can be reduced in comparison to approaches that do not include acceleration circuitry 520 configured to perform such conversion and/or subsequent operations. This reduction in processing time, resource consumption, and/or storage space can improve the function of a computing device in which the acceleration circuitry 520 is operating by reducing the number of clock signals used in performing such operations, which may reduce an amount of power consumed by the computing device and/or an amount of time to perform such operations, as well as by freeing up processing and/or memory resources for other tasks and functions.

Figure 6:
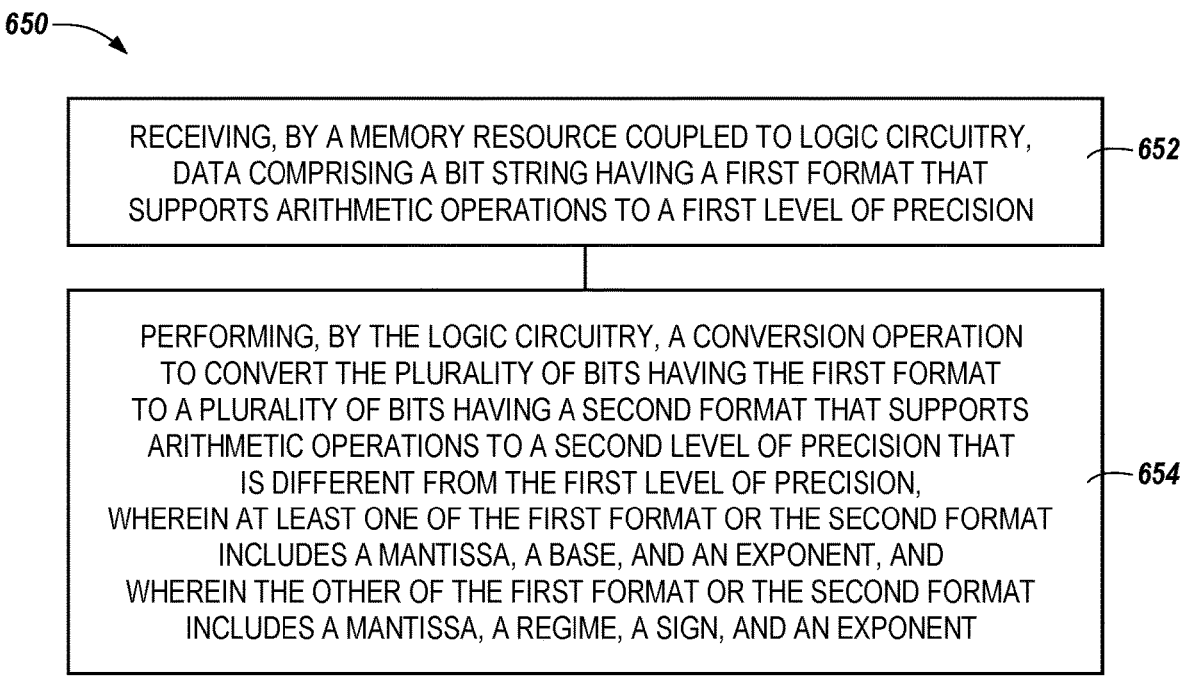
FIG. 6 is a flow diagram representing an example method for arithmetic logic circuitry in accordance with a number of embodiments of the present disclosure.

FIG. 6 is a flow diagram representing an example method 650 for arithmetic logic circuitry in accordance with a number of embodiments of the present disclosure. At block 652, the method 650 can include receiving, by a memory resource coupled to logic circuitry, data comprising a bit string having a first format that supports arithmetic operations to a first level of precision. The memory resource can be analogous to the memory resource 124/224 illustrated in FIGS. 1 and 2, respectively, and the logic circuitry can be analogous to the logic circuitry 122/222 illustrated in FIGS. 1 and 2, respectively.

At block 654, the method 650 can include performing, by the logic circuitry, a conversion operation to convert the data having the first format a second format that supports arithmetic operations to a second level of precision that is different from the first level of precision. In some embodiments, at least one of the first format or the second format includes a mantissa, a base, and an exponent, and wherein the other of the first format or the second format includes a mantissa, a regime, a sign, and an exponent. For example, at least one of the first format and the second format can be a floating-point format and the other of the first format or the second format can be a universal number format, such as a posit format. As described above, the first format can be a floating-point format and the second format can be a posit format.

In some embodiments, the method 650 can include performing, by the logic circuitry, an operation using the data in the second format. The operation can be an arithmetic operation and/or a logical operation, as described in more detail above. In some embodiments, the operation can be an operation used as part of training a neural network. For example, the operation can be a convolution operation, a sigmoid function operation, etc.

The method 650 can further include writing a result of the operation to the memory resource. As described above in connection with FIG. 2, the result of the operation can, in the alternative, be stored in a memory array (e.g., the memory array 130/230 illustrated in FIGS. 1 and 2, herein) coupled to the logic circuitry and/or the memory resource. In some embodiments, the method 650 may further include performing a second conversion operation using the logic circuitry to convert the result of the operation back to the first format. The method 650 can further include transferring the converted result of the operation to a host (e.g., the host 102/202 illustrated in FIGS. 1 and 2, herein) coupled to the logic circuitry and the memory resource.

In some embodiments, the method 650 can include performing, by the logic circuitry, the conversion operation, the operation using the plurality of bits having the second format, and/or a subsequent conversion operation to convert the result of the operation back to the first format in the absence of an intervening command from the host. That is, as described in connection with FIGS. 1, 2, and 5, herein, the logic circuitry can be robust enough to perform the conversion operation, the operation using the bit string having the second format, and/or a subsequent conversion operation to convert the result of the operation back to the first format without encumbering (e.g., without receiving intervening commands from) circuitry (e.g., a host or other circuitry) external to the logic circuitry.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a memory resource included in a memory device and configured to receive data comprising a bit string having a first format that provides a first level of precision; and
    logic circuitry comprising a reduced instruction set computing device and included in the memory device and coupled to the memory resource, wherein the logic circuitry is configured to:
        convert, responsive to receipt of an initiation command, the bit string to a second format that provides a second level of precision that is different from the first level of precision; and
        write the bit string having to the second format to the memory resource.

2. The apparatus of claim 1, wherein the logic circuitry is further configured to cause performance of an operation using the bit string having the second format.

3. The apparatus of claim 2, wherein the logic circuitry is configured to convert the bit string to the first format in response to a determination that the operation using the bit string is completed.

4. The apparatus of claim 2, wherein the logic circuitry is further configured to perform at least one of an arithmetic operation and a logic operation as part of performance of the operation.

5. The apparatus of claim 1, wherein the first format comprises a floating-point format and the second format comprises a universal number (Unum) format.

6. The apparatus of claim 1, wherein the first format comprises an IEEE 754 format and the second format comprises a Type III Unum format or a posit format.

7. The apparatus of claim 1, wherein one of the first format or the second format includes a mantissa, a base, and an exponent portion, and wherein the other of the first format or the second format includes a mantissa, a sign, a regime, and an exponent portion.

8. The apparatus of claim 1, wherein the logic circuitry includes an arithmetic logic unit, a field programmable gate array, or a combination thereof.

9. The apparatus of claim 1, wherein the memory device is coupled to a host and configured to:
    receive the data in the first format from the host;
    perform, subsequent to conversion of the data form the first format to the second format, an operation using the bit string having the second format;
    convert a resultant bit string that represents performance of the operation to the first format in response to a determination that the operation using the bit string having the second format is completed; and
    transfer the resultant bit string having the first format to the host.

10. The apparatus of claim 8, wherein the logic circuitry is configured to receive, perform the operation, convert the resultant bit string, and transfer the converted resultant bit string without receipt of an intervening command from the host.

11. A method, comprising:
    receiving, by a memory resource coupled to logic circuitry, data comprising a plurality of bits having a first format that supports arithmetic operations to a first level of precision; and
    performing, by the logic circuitry, a conversion operation to convert the plurality of bits having the first format to a plurality of bits having a second format that supports arithmetic operations to a second level of precision that is different from the first level of precision, wherein at least one of the first format or the second format includes a mantissa, a base, and an exponent, and wherein the other of the first format or the second format includes a mantissa, a regime, a sign, and an exponent, and wherein the logic circuitry comprises a reduced instruction set computing device.

12. The method of claim 11, further comprising performing, by the logic circuitry, an operation using the plurality of bits having the second format.

13. The method of claim 12, wherein performing the operation using the plurality of bits having the second format further comprises performing a convolution operation, a sigmoid function operation, or both.

14. The method of claim 12, further comprising:
    writing a result of the operation in the memory resource; and
    performing, by the logic circuitry, a second conversion operation to convert the result of the operation to the first format.

15. The method of claim 11, further comprising performing the conversion operation without receiving an intervening command from circuitry coupled to the memory resource and the logic circuitry.

16. A system, comprising:
    a memory device comprising logic circuitry coupled to a memory resource, wherein the logic circuitry comprises a reduced instruction set computing device;
    a controller coupled to the logic circuitry and the memory resource; and a host coupled to a memory device, wherein the memory device is configured to receive a plurality of bits having a first format that supports arithmetic operations to a first level of precision from the host, and wherein the controller is configured to:
write the plurality of bits having the first format to the memory resource; and
cause the logic circuitry to perform a conversion operation to convert the plurality of bits having the first format to a plurality of bits having a second format that supports arithmetic operations to a second level of precision that is different from the first level of precision.

17. The system of claim 16, wherein the controller is configured to cause the logic circuitry to perform the conversion operation without encumbering the host.

18. The system of claim 16, wherein one of the first format or the second format includes three sets of bits, and wherein the other one of the first format or the second format includes four sets of bits.

19. The system of claim 16, wherein the first format comprises an IEEE 754 format and the second format comprises a Type III Unum format or a posit format.

20. The system of claim 16, wherein the logic circuitry includes an arithmetic logic unit, a field programmable gate array, or a combination thereof.

21. The system of claim 16, wherein the controller is further configured to cause the logic circuitry to perform an arithmetic operation or a logical operation, or both, using the plurality of bits having the second format.

* * * * *